March 13, 1928.  1,662,608
J. HILL
WORKBENCH
Filed March 21, 1927  2 Sheets-Sheet 1
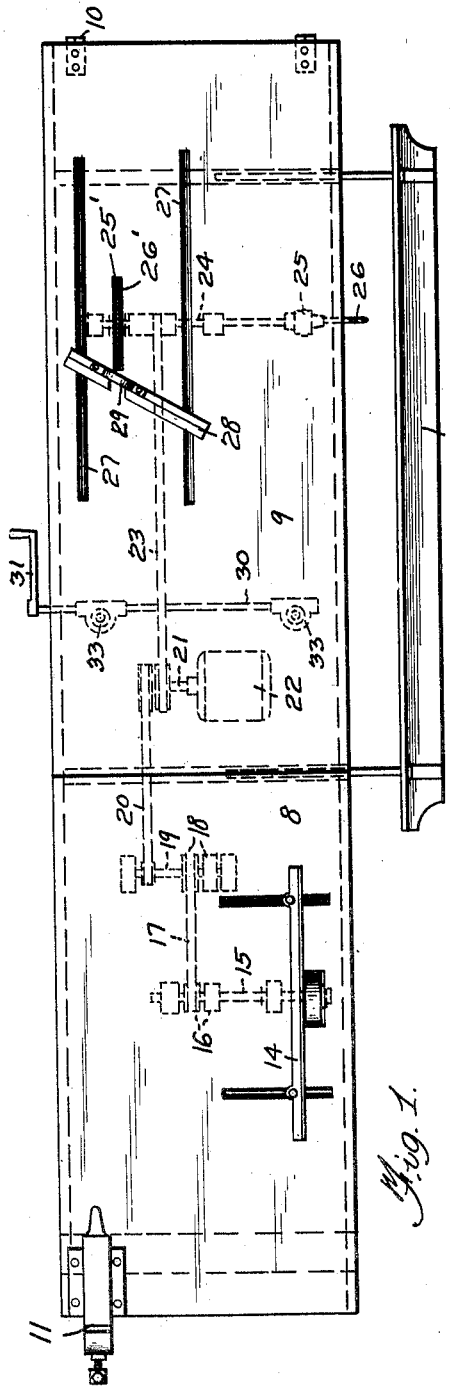
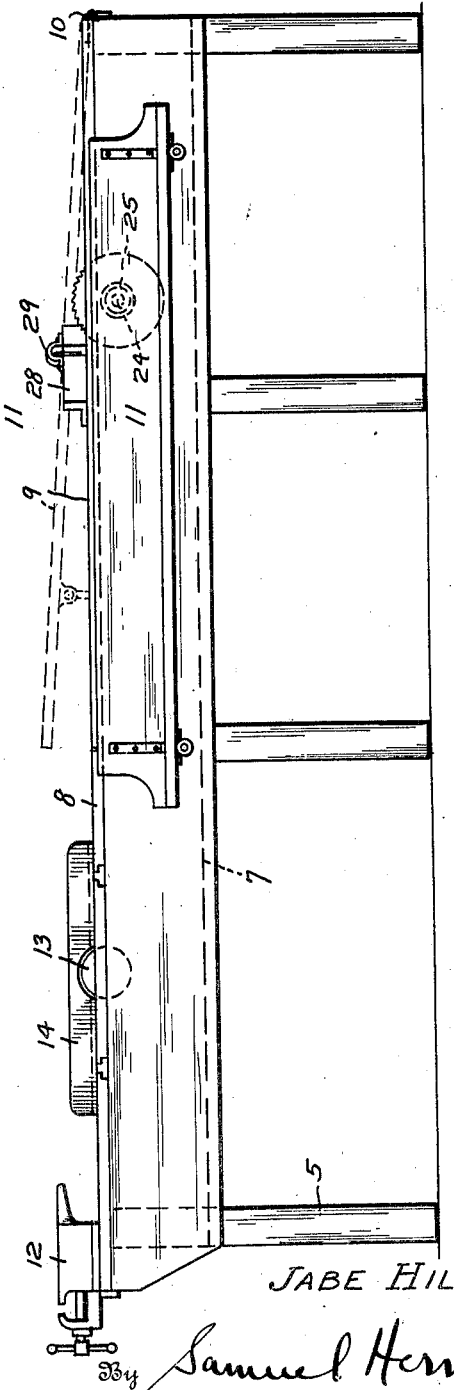
Inventor
JABE HILL,
By Samuel Herrick,
Attorney March 13, 1928.
J. HILL
WORKBENCH
Filed March 21, 1927
1,662,608
2 Sheets-Sheet 2
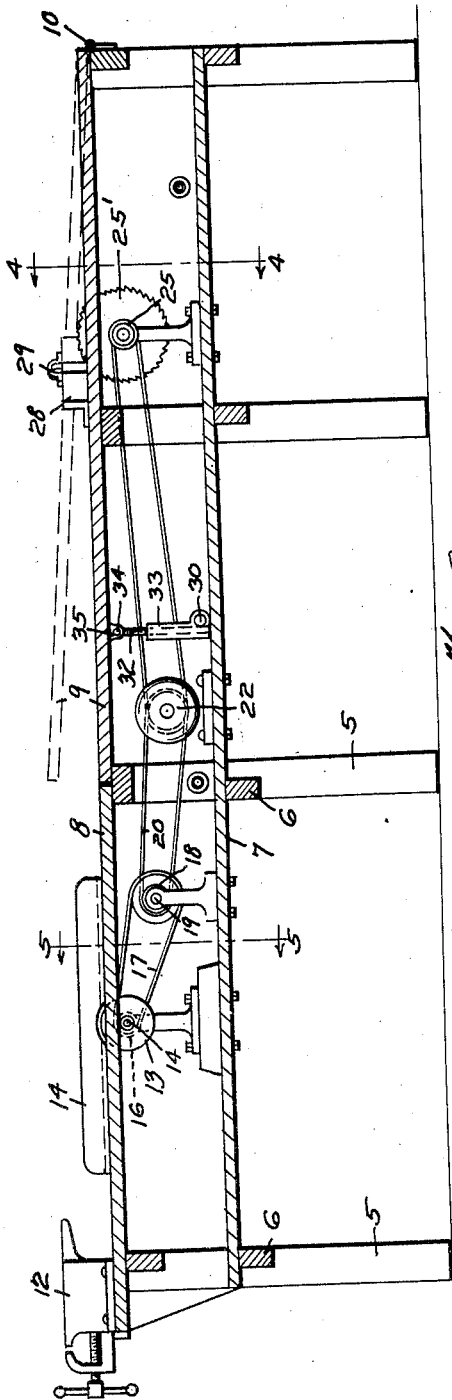
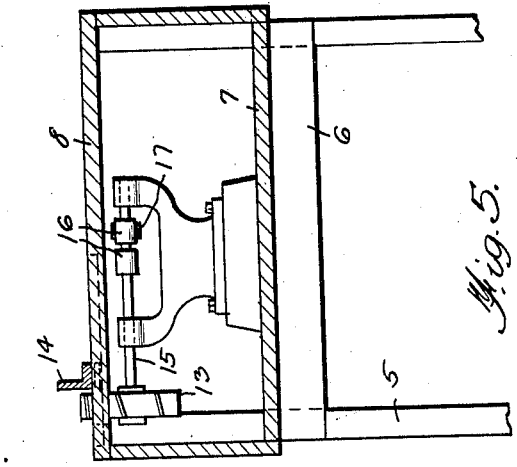
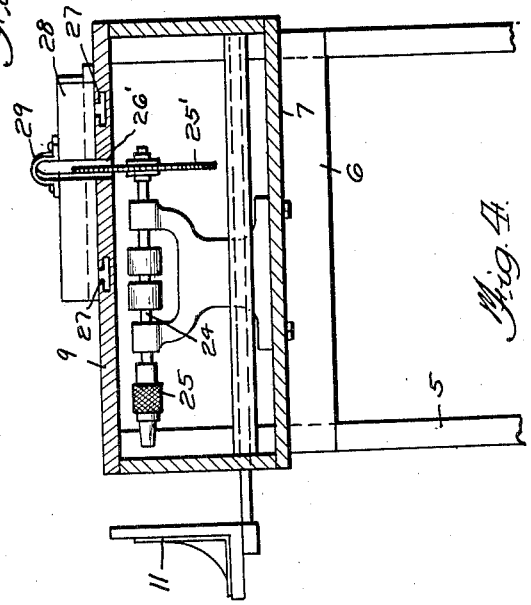
Inventor
JABE HILL,
By Samuel Herrick,
Attorney Patented Mar. 13, 1928.

1,662,608

UNITED STATES PATENT OFFICE.

JABE HILL, OF PHOENIX, ARIZONA.

WORKBENCH.

Application filed March 21, 1927. Serial No. 177,149.

This invention relates to a work bench and general utility machine, primarily intended for the use of carpenters, but capable of use in many other relations where woodworking is to be done. It is a primary object of the invention to provide a machine of the character indicated adapted to be easily transported from place to place, to pass through ordinary doorways, and one which will render it possible to perform many different kinds of woodworking operations with facility and quickness.

Further objects and advantages of the invention will be set forth in the detailed description which follows.

In the accompany drawings:

Fig. 1 is a plan view of a machine constructed in accordance with the invention.

Fig. 2 is a front elevation thereof.

Fig. 3 is a longitudinal vertical sectional view therethrough.

Fig. 4 is a vertical sectional view on line 4—4 of Fig. 3, and

Fig. 5 is a vertical sectional view on line 5—5 of Fig. 3.

Like numerals designate corresponding parts in all of the figures of the drawings.

The machine or bench of the present invention comprises supporting legs 5 and cross supports 6, which support a lower deck 7 and an upper deck 8. A part of the upper deck is in the form of a hinged top 9 which is hingedly mounted at 10. A conventional form of carpenter's vise is indicated at 11. A bench vise 12 is secured at one end of the upper deck. A jointer 13 projects through the upper deck 8 adjacent a suitable guide 14. This jointer is carried by a shaft 15 which is driven through suitable tight and loose pulleys 16, belt 17 and tight and loose pulleys 18 from a counter shaft 19. This counter shaft, in turn, is driven by a belt 20 from the shaft 21 of an electric motor 22. A belt 23 drives from the shaft of the motor to a shaft 24. The shaft 24 carries a chuck 25 for the reception of an auger 26 which constitutes the boring element of the machine. The shaft 24 also constitutes the mandrel of a circular saw or dado cutter 25'. The element 25', whether it be an ordinary cut-off or rip saw, or a dadoing device, projects through a slot 26' formed in the hinged section 9 of the upper deck. Runs 27 carried by said hinged section, constitute trackways for miter box 28, said miter box having a gooseneck 29 connecting the opposite end portions of the same at the point of said miter box that is aligned with the saw 25'. A transverse worm shaft 30 is adapted to have a crank 31 mounted upon its outer end by which it may be turned, and this worm shaft has operating engagement with the shanks 32 of screw jacks 33. These screw jacks have spherical heads 34 which rest in concave sockets 35 upon the under side of the hinged section 9 of the upper deck, so that as the shanks 32 are raised, under their threaded engagement with the body portions of the jacks 33, the hinged section 9 will be elevated. Thus work placed upon the hinged section 9 may be so held with respect to the saw as to be cut entirely through or merely grooved upon its under side and such grooving may be to any desired depth. It is manifest that the same will be true with respect to any dadoing operation.

It is to be understood that the invention is not limited to the precise construction set forth but that it includes within its purview whatever changes fairly come within either the terms or the spirit of the appended claim.

Having described my invention what I claim is:

A machine of the character described, comprising a lower deck and an upper deck, a portion of the upper deck being hinged transversely of the machine to adapt it to tilt in the direction of the length of the machine, and a circular saw supported from the lower deck and projecting through the tilting portion of the upper deck through an opening which extends longitudinally of the machine, a pair of guide-ways carried by the tilting portion of the machine, one upon each side of the saw, a miter box mounted to slide upon said guideways, lying partly upon one side of the saw and partly upon the other side of the saw, a goose-neck connecting said portions of the miter box, and means thrusting between the lower deck and the tilting top for adjusting the same to varying heights.

In testimony whereof he affixes his signature.

JABE HILL.